United States Patent [19]
Mizuno

[11] Patent Number: 5,906,541
[45] Date of Patent: May 25, 1999

[54] METHOD AND APPARATUS FOR CONTROLLING A MOTOR ACTUATOR UNDER DRIVE MODE, AND A RECORDING MEDIUM STORING A PROGRAM FOR CARRYING OUT THE METHOD

[75] Inventor: Kunio Mizuno, Kohnan-machi, Japan

[73] Assignee: Zexel Corporation, Tokyo, Japan

[21] Appl. No.: 08/874,489

[22] Filed: Jun. 13, 1997

[30] Foreign Application Priority Data

Jun. 21, 1996 [JP] Japan ..................................... 8-179815

[51] Int. Cl.$^6$ ....................................................... B60H 1/00
[52] U.S. Cl. ............................................. 454/75; 454/156
[58] Field of Search ........................... 454/75, 121, 156; 318/466, 467, 468, 560, 599, 603, 811; 236/13

[56] References Cited

U.S. PATENT DOCUMENTS

| | | | |
|---|---|---|---|
| 4,529,920 | 7/1985 | Yoshida et al. ........................ | 318/466 |
| 4,974,776 | 12/1990 | Oshizawa .................................. | 236/13 |
| 5,258,694 | 11/1993 | Ohnishi et al. .......................... | 318/135 |
| 5,647,794 | 7/1997 | Ohkubo et al. .......................... | 454/121 |
| 5,705,907 | 1/1998 | Miyamori et al. ....................... | 318/599 |

*Primary Examiner*—Harold Joyce
*Attorney, Agent, or Firm*—Wenderoth, Lind & Ponack, L.L.P.

[57] ABSTRACT

When a difference in opening angle of an air-mixing door between a target position and an actual position is larger in value than a width of an insensitive band area, a mixing door actuator is driven to a heating side or a cooling side depending on the amount of the difference so as to have the air-mixing door reach its target position in a condition in which the insensitive band area is eliminated. When the difference is smaller than the predetermined band width, i.e., when a drive position of the mixing door actuator is in the insensitive band width, this band width is effected so that the mixing door actuator is stopped in operation to stabilize the operation.

19 Claims, 8 Drawing Sheets

METHOD AND APPARATUS FOR CONTROLLING A MOTOR ACTUATOR UNDER DRIVE MODE, AND A RECORDING MEDIUM STORING A PROGRAM FOR CARRYING OUT THE METHOD

BACKGROUND OF THE INVENTION

1. Field of the Invention

The present invention relates to a method and apparatus for controlling a motor actuator under drive mode, and to a recording medium storing a program for carrying out the method, and more particularly to improvements in accuracy of the control of motor actuators for driving air-conditioning doors used in a vehicle air-conditioning equipment and the like.

2. Description of the Relate Art

A conventional method of this kind is disclosed, for example, in Japanese Patent Publication No. Sho 59-43326 as a method for controlling a air-mixing door by means of a motor actuator of a vehicle air-conditioning equipment. The conventional method includes the steps of providing a so-called insensitive band area in the vicinity of a target opening angle and de-energizing the motor actuator when the air-mixing door reaches the in sensitive band area.

On the other hand, for example, Japanese Patent Laid-Open No. Sho 61-287809 discloses another method for controlling the air-mixing door by means of the motor actuator of the vehicle air-conditioning equipment. That method includes the steps of providing a so-called insensitive band area and a target opening angle in each of opposite sides of a standard opening angle of the air-mixing door and preventing the motor actuator from "hunting" in the vicinity of the standard opening angle of the air-mixing door to improve in control accuracy the motor actuator.

There is further another conventional method of this kind, as disclosed in Japanese Patent Publication No. Hei 8-2200. That method includes steps of detecting a difference between the number of drive pulses required by a drive circuit for a stepping motor forming a motor actuator and that of actual pulses received by the stepping motor, judging the difference in size with reference to a pair of standard values, and driving the stepping motor with a predetermined number of pulses depending on the result of this judgment. The number of the drive pulses is reduced when the number of the drive pulses required by the drive circuit varies violently, which improves the service life of the stepping motor.

As for the above-mentioned conventional method Patent Publication No. Sho 59-43326, when the motor forming the motor actuator is of a type suffering from a so-called overrunning so that the motor cannot stop immediately after the supply of a drive signal to the motor is cut, such overrunning makes it possible for the motor to reach its target position in a condition in which the supply of the drive signal to the motor is cut at a time when the motor reaches the insensitive band area of the target position. However, when the motor is of a type with no overrunning after the supply of the drive signal to the motor is cut, as with a stepping motor, the motor immediately stops when it reaches the insensitive band area, which produces a difference between the target position and its actual position. Since this difference corresponds in size to the insensitive band area, the motor cannot reach its target position. This is a problem inherent in the above one of the conventional methods.

On the other hand, as to the Japanese Patent Laid-Open No. Sho 61-287809 disclosing another conventional method, it is necessary to provide both the target opening angle and its insensitive band area in each of opposite sides of the standard target opening angle, which makes the entire system complicated. Further, in the case of the above-mentioned Japanese Patent Publication No. Sho 59-43326, its controlling accuracy depends on the overrunning properties of the motor actuator, which causes many problems when the motor actuator is constructed of a stepping motor.

This Japanese Patent Laid-Open No. Sho 61-287809 also discloses an apparatus for controlling the air-mixing door by means of the motor actuator of the vehicle air-conditioning equipment. In this apparatus, in order to avoid the problems described above, the motor actuator may be of a "no overrun" type. However, in this case, the insensitive band area is extremely reduced in width to substantially "zero", which forces the motor actuator to operate without stopping. Because, even, the slightest change in a signal representing the thermal environment, calculated in the vehicle air-conditioning equipment produces the drive signal being supplied to the motor actuator. Such restless operation (i.e., "hunting") of the motor actuator considerably reduces its services life, and produces harsh mechanical noise.

On the other hand, in an apparatus for carrying out the method disclosed in the Japanese Patent Publication No. Hei 8-2200, in contrast with the two above-mentioned conventional techniques, the motor actuator is controlled so as to gradually approach its target position. Consequently, the motor actuator requires much more time to reach the target position than the others, which impairs the apparatus in responsibility. Further, since this apparatus has no insensitive band area in contrast with the others, the apparatus has poor stability in operation. In order to improve the apparatus in this respect, a timer is used to prevent the apparatus from operating for a predetermined period of time so as to improve the apparatus in stability in operation. However, the use of such timer complicates the apparatus in construction.

SUMMARY OF THE INVENTION

It is an object of the present invention to provide a method and apparatus for controlling a motor actuator, wherein the motor actuator is substantially free from overrunning in operation and excellent in controlling accuracy, stability in controlling operation, and in speed to reach its target position.

It is another object of the present invention to provide a recording medium storing a program for carrying out the method of the present invention for controlling the motor actuator, wherein the motor actuator is substantially free from overrunning in operation and excellent in controlling accuracy, stability in controlling operation, and in speed to reach its target position.

It is still further another object of the present invention to provide the method and apparatus for controlling the motor actuator, and a recording medium storing the program for carrying out the method, wherein the provision of the insensitive band area may be selectively effected and undone.

According to a first aspect of the present invention, the above objects of the present invention are accomplished by providing a method as follows. An insensitive band area having a predetermined band width in the vicinity of a target position of the motor actuator is provided. Such provision of the insensitive band area is undone when the motor actuator is driven in an area outside the insensitive band area, which permits the motor actuator to be driven to the target position. The provision of the insensitive band area is effected after the actuator motor reaches the target position. The motor actuator is stopped from being driven when a drive position of the motor actuator is inside the insensitive band area.

In the above method of the present invention in which the motor actuator is constructed of a motor with a minimum overrun, for example, a stepping motor, it is possible for the motor actuator to stop at its desired position without overrunning and is stable in operation thereafter. When the drive position of the motor actuator is in the the insensitive is driven in an area, which permits insensitive band area having the predetermined band width of the target position, the motor actuator is not driven as it is in the conventional methods, which stabilizes the motor actuator in operation. On the other hand, when the drive position of the motor actuator is out of the insensitive band area, the motor actuator is driven even when it enters the insensitive band area until it reaches its target drive position, which improves the controlling accuracy of the motor actuator.

According to a second aspect of the present invention, the above objects of the present invention are accomplished by providing an apparatus for controlling a motor actuator under drive mode, provided with a drive means for driving the motor actuator in accordance with an input signal supplied from outside. The apparatus includes a position judging means for judging a drive position of the motor actuator and an actuation control means for controlling the motor actuator in operation. The actuation control means operates the drive means when the position judging means judges that the motor actuator is out of a predetermined range of a target drive position, and stops operation of the drive means when the position judging means judges that the motor actuator comes within the predetermined range of the target drive position.

According to a third aspect of the present invention, the above objects of the present invention are accomplished by providing the apparatus for controlling the motor actuator under drive mode, as set forth in the second aspect of the present invention, wherein the motor actuator is operable for rotatably driving an air-mixing door used in a vehicle air-conditioning equipment. The position judging means is provided with a rotational motion recognition means for recognizing an angular position of the air-mixing door. The position judging means is constructed of the rotational motion recognition means and an angular difference judging means for judging whether or not a difference in opening angle of the air-mixing door between its target angle, which is calculated based on a desired air-outlet temperature according to a predetermined equation, and an actual angle, which corresponds to the angular position of the air-mixing door recognized by the rotational motion recognition means, exceeds a predetermined value.

A judgment that the difference in opening angle of the air-mixing door judged by the angular difference judging means is larger than or equal to the predetermined value means that the actual opening angle of the air-mixing door is out of a predetermined range of the target opening angle, which corresponds to the fact that an actual position of the motor actuator is out of the predetermined range of the target drive position. A judgment that the difference in opening angle of the air-mixing door judged by the angular difference judging means is less than the predetermined value means that the actual opening angle of the air-mixing door comes within the predetermined range of the target opening angle, which corresponds the fact that the actual position of the motor actuator comes within the predetermined range of the target drive position.

In the apparatus of the present invention having the above construction, all the drive means, the opening angle judging means and the actuation control means are realized by executing the predetermined program in a so-call CPU.

In the apparatus of the present invention in which the motor actuator is constructed of a motor with a minimum overrun, for example, a stepping motor, it is possible for the motor actuator to stop at its desired position without overrunning and is stable in operation thereafter. When the angular difference judging means judges that the difference in opening angle of the air-mixing door between its target angle and the actual angle corresponding to the angular position of the air-mixing door, exceeds the predetermined value, the motor actuator is driven by both the drive means and the actuation control means until the air-mixing door reaches its target opening angle, which improves the apparatus of the present invention in controlling accuracy. After the air-mixing door reaches its target opening angle, the insensitive band area provided in each of opposite sides of this target opening angle is effected. When the air-mixing door is in this sensitive band area, the motor actuator is not driven to stabilize its operation around the target position.

According to a fourth aspect of the present invention, the above objects of the present invention are accomplished by providing the apparatus for controlling the motor actuator under drive mode, as set forth in the second aspect of the present invention, wherein the motor actuator is operable for rotatably driving an air-mixing door used in a vehicle air-conditioning equipment. The position judging means is provided with an air temperature detection means for detecting a temperature of air inside a vehicle. The position judging means is constructed of the air temperature detection means and a temperature difference judging means for judging whether or not a difference in temperature of air between any two of its target air-outlet temperature calculated based on various data inputted from outside, its estimated temperature calculated based on the opening angle of the air-mixing door, and its actual temperature detected by the air temperature detection means is larger than or equal to a predetermined value. A judgment that the difference in temperature of air judged by the temperature difference judging means is larger than or equal to the predetermined value means that the actual opening angle of the air-mixing door is out of a predetermined range of the target opening angle, which corresponds to the fact that an actual position of the motor actuator is out of the predetermined range of the target drive position. A judgment that the difference in temperature of air judged by the temperature difference judging means is less than the predetermined value means that the actual opening angle of the air-mixing door comes within the predetermined range of the target opening angle, which corresponds the fact that the actual position of the motor actuator comes within the predetermined range of the target drive position.

In the apparatus of the present invention having the above construction, all the drive means, the opening angle judging means and the actuation control means are realized by executing the predetermined program in the CPU.

In the apparatus of the present invention in which the motor actuator is constructed of a motor with a minimum overrun, for example, with a stepping motor, it is possible for the motor actuator to stop at its desired position without overrunning and is stable in operation thereafter. When the temperature difference judging means judges that the temperature difference in air between the air-outlet temperature in a vehicle compartment and the actual temperature exceeds the predetermined value, the motor actuator is driven by both the actuation control means and the drive means until the air-mixing door reaches its target opening angle, so that the apparatus of the present invention is improved in controlling accuracy. After the air-mixing door reaches its target opening angle, the in sensitive band area provided in each of opposite sides of the target opening angle is effected. When the air-mixing door is in the insensitive band area, the motor actuator is not driven, which stabilizes the motor actuator in operation around its target position.

According to a fifth aspect of the present invention, the above objects of the present invention are accomplished by providing a recording medium storing a program for carrying out a method for controlling a motor actuator under drive mode. The program instructs the CPU (computer) to provide an insensitive band area having a predetermined band width in the vicinity of a target position of the motor actuator, to undo such provision of the insensitive band area when the motor actuator is driven in an area outside the insensitive band area, which permits the motor actuator to be driven to the target position, to effect the provision of the insensitive band area after the actuator motor reaches the target position, and to stop the motor actuator from being driven when a drive position of the motor actuator is inside the insensitive band area.

DESCRIPTION OF THE PREFERRED EMBODIMENTS

Hereinbelow, the present invention will be described in detail with reference to the accompanying drawings.

Incidentally, many changes and modifications can be made to the embodiments of the present invention without departing from its spirit, it is intended that all matters given in the following description and the accompanying drawings shall be interpreted to be illustrative only, and not as a limitation to the scope of the present invention.

Figure 1:
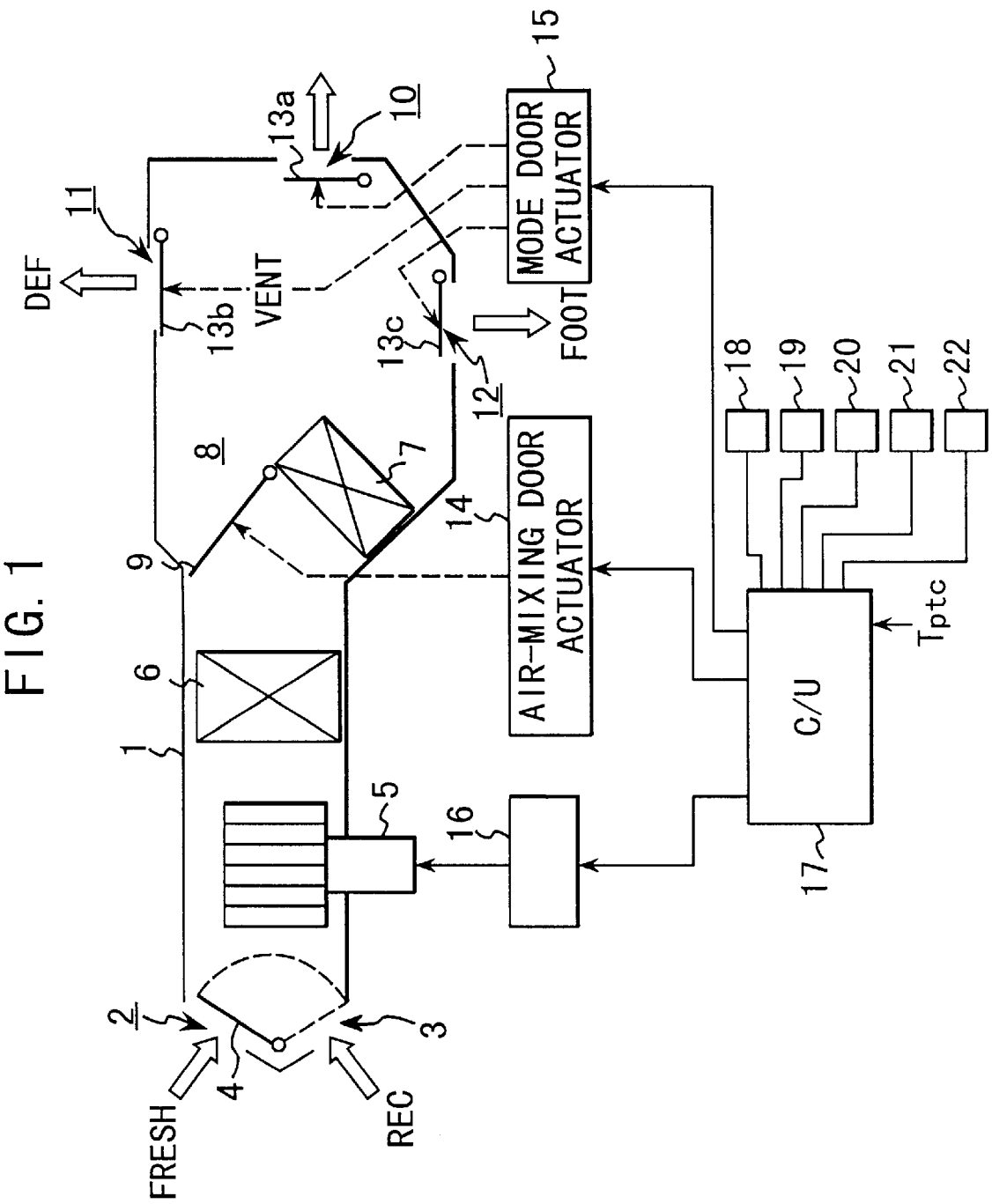
FIG. 1 is a block diagram of the vehicle air-conditioning equipment with a first embodiment of the apparatus of the present invention for controlling the motor actuator under drive mode.

In the following embodiments, the present invention is applied to a motor actuator of a vehicle air-conditioning equipment, which is schematically shown in FIG. 1.

As shown in FIG. 1, in this air-conditioning equipment, an upstream side of an air-conditioning duct 1 is divided into a fresh-air intake opening 2 and an indoor-air intake opening 3. Provided in such branch portion of the duct 1 between these intake openings 2, 3 is an intake door 4 which switches its intake air from fresh air to the indoor air or vice versa.

Sequentially provided in a downstream side of the air-conditioning duct 1 are a blower motor 5, an evaporator 6, and a heater core 7. Incidentally, the evaporator 6 is combined with a compressor (not shown) and like components to form a refrigerant cycle of the vehicle air-conditioning equipment.

On the other hand, the heater core 7 is eccentrically mounted in the air-conditioning duct 1 so as to form a by-pass passage 8 between a side wall portion of the duct 1 and the heater core 7. Provided in front of this heater core 7 is the air-mixing door 9 which controls both the amount of air passing through the heater core 7 and that passing through the by-pass passage 8.

A downstream side of the air-conditioning duct 1 is divided into a vent opening 10, a defroster opening 11 and a heater opening 12. All of these openings 10, 11, 12 open into a passenger compartment of the vehicle, and are provided with mode doors 13a, 13b, 13c, respectively.

Each of the air-mixing door 9, and the mode doors 13a, 13b, 13c is rotatably driven by motor actuators 14, 15 each of which is constructed of a stepping motor (not shown). More specifically, the air-mixing door 9 is driven by the motor actuator 14 serving as an air-mixing door actuator (shown in FIG. 1), while the mode doors 13a, 13b, 13c are driven by the motor actuator 15 serving as a mode door actuator, as shown in FIG. 1.

On the other hand, the blower motor 5 is driven by a blower driving circuit 16.

A control unit 17 (i.e., C/U shown in FIG. 1) is substantially constructed of a so-called CPU (not shown), and controls in operation the air-conditioning equipment which comprises the blower driving circuit 16, the air-mixing door actuator 14 and the mode door actuator 15.

Figure 2:
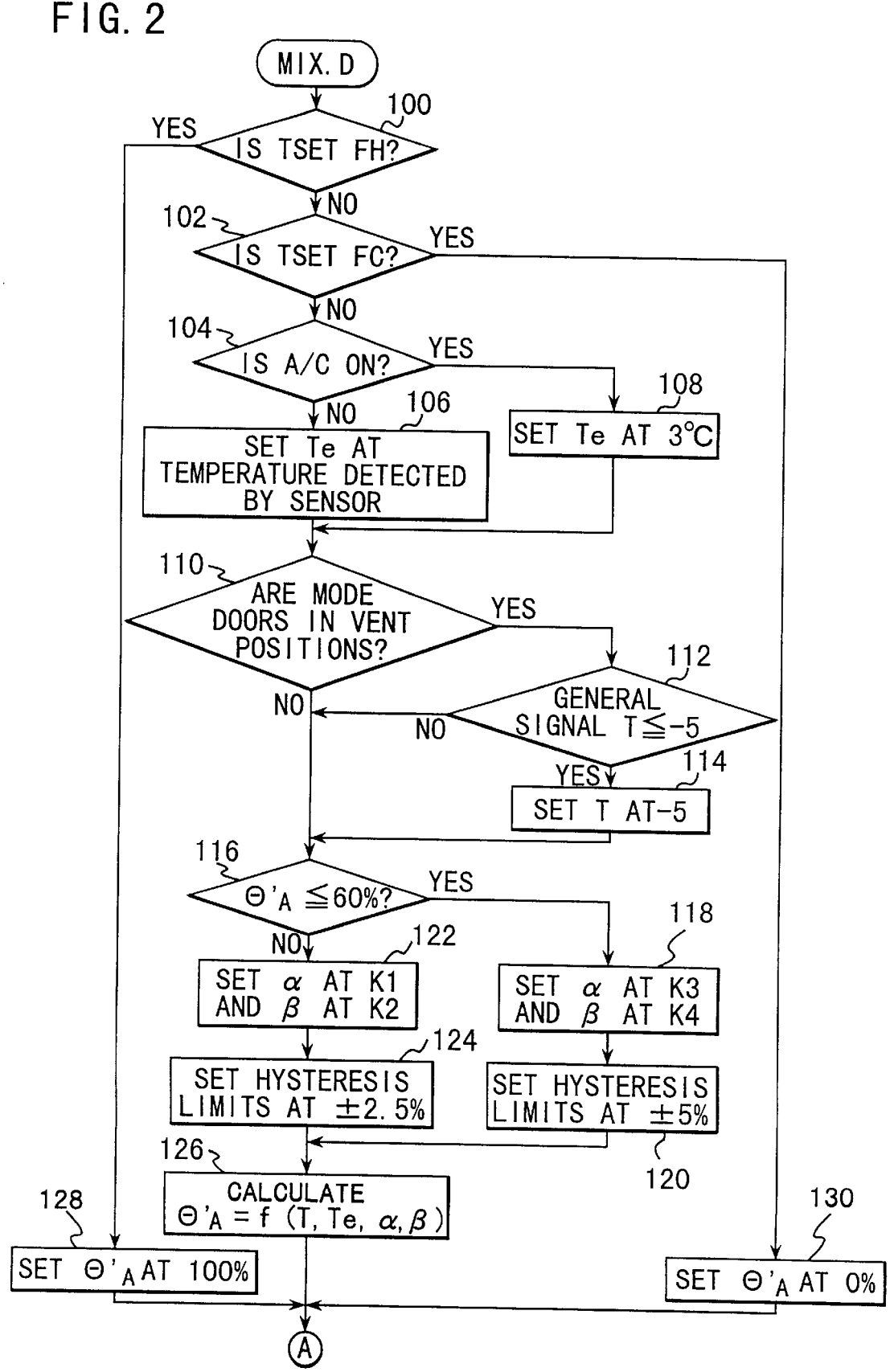
FIG. 2 is an upper part of a flowchart for a subroutine of a first embodiment of the method of the present invention for controlling the mixing door actuator used in the apparatus of the present invention shown in FIG. 1.
Figure 3:
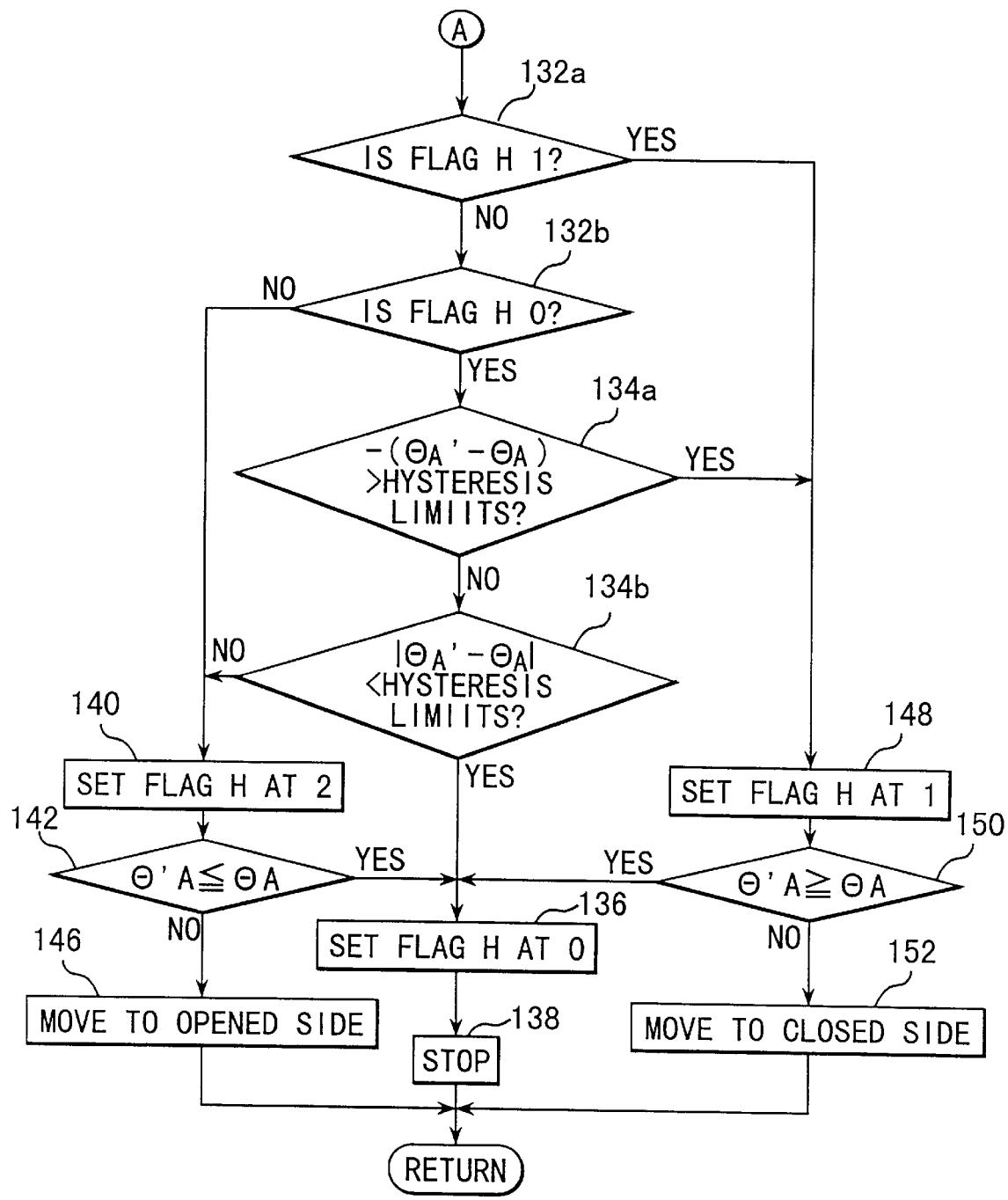
FIG. 3 is a lower part of the flowchart for the subroutine shown in FIG. 2.
Figure 4:
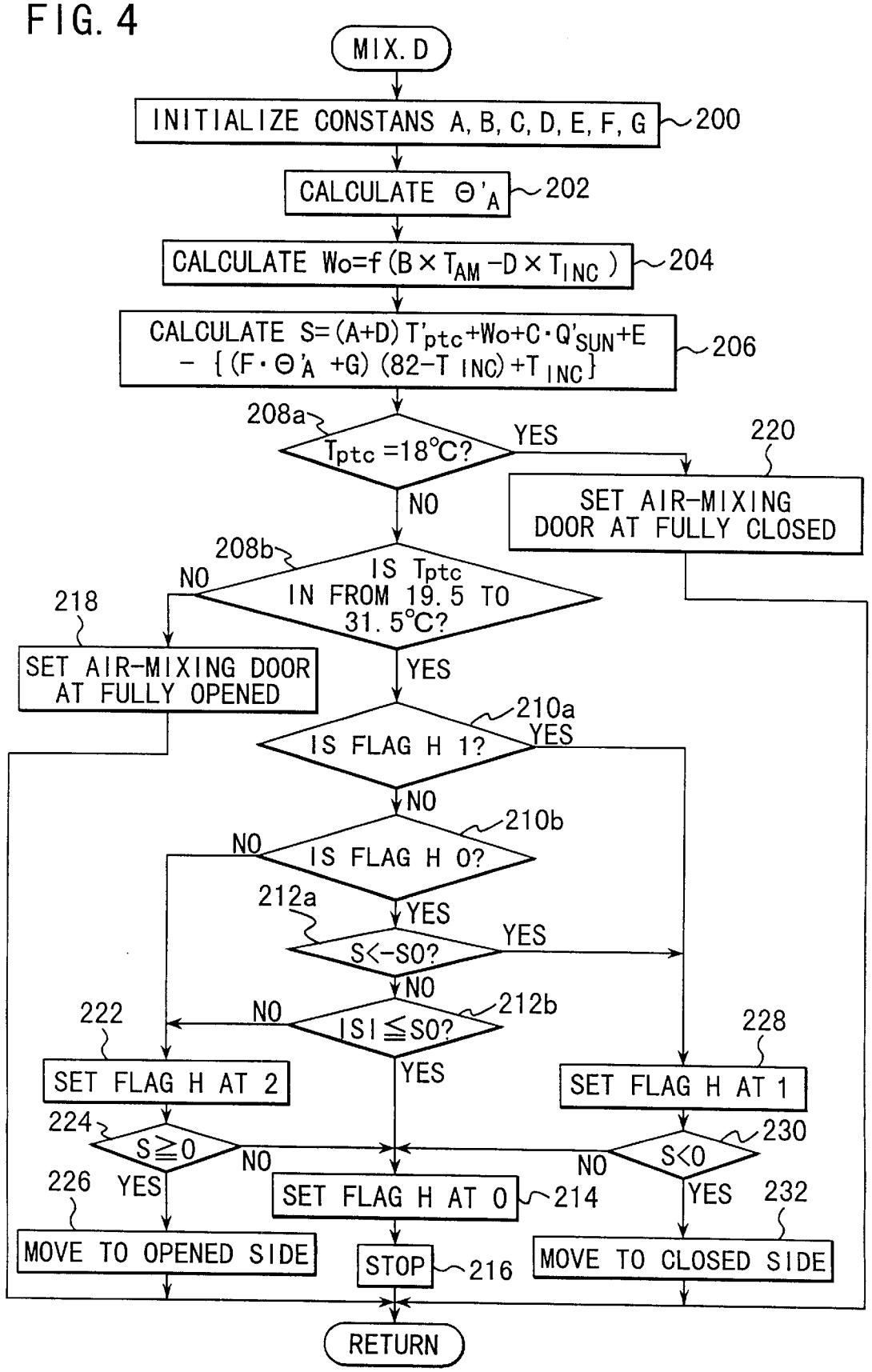
FIG. 4 is a flowchart for a subroutine of a second embodiment of the method of the present invention for controlling the mixing door actuator used in the apparatus of the present invention shown in FIG. 1.

Incidentally, in the embodiment shown in FIG. 1, among various sensors used therein, ones only shown are: an evaporator temperature sensor 18 for detecting a temperature Te of the evaporator 6, the temperature Te being required when the air-mixing door 9 is controlled by the control unit 17 according to flowcharts shown in FIGS. 2 to 4; an outside air temperature sensor 19 for detecting an outside air temperature $T_{AM}$; a solar radiation sensor 20 for detecting a quantity $Q_{SUN}$ of solar radiation; a passenger compartment temperature sensor 21 for detecting a passenger compartment temperature $T_{INC}$; and, an air-mixing door opening angle sensor 22 for detecting an actual opening angle $\Theta_A$ completed in the air-mixing door 9.

FIG. 2 shows an upper part of a flowchart for a subroutine of a first embodiment of the method of the present invention for controlling the mixing door actuator 14 used in the air-conditioning equipment shown in FIG. 1.

In operation, as shown in FIG. 2, first, in a step 100, it is judged whether or not a temperature setting lever (not shown) of the vehicle air-conditioning equipment is set at a position of "FULL HEAT" (i.e., FH: maximum heating). When it is judged that the lever is set at "FH", this step 100 is followed by a subsequent step 128 in which a target opening angle $\Theta_A'$ is set at 100 percent in order to set the temperature setting lever (not show) at the "FULL HEAT" position. After that, the step 128 is followed by a subsequent step 132a (shown in FIG. 3).

On the other hand, in the above step 100 shown in FIG. 2, when it is not judged that the lever is set at "FH", this step 100 is followed by a subsequent step 102 in which it is judged whether or not a temperature setting lever (not shown) of the vehicle air-conditioning equipment is set at a position of "FULL COOL" (i.e., FC: maximum cooling). In the step 102, when it is judged that the lever is set at "FC", the step 102 is followed by a subsequent step 130 in which a target opening angle $\Theta_A'$ is set at 0 percent in order to set the temperature setting lever (not show) at the "FULL COOL" position. After that, the step 130 is followed by the step 132a (shown in FIG. 3).

On the other hand, in the above step 102 shown in FIG. 2, when it is not judged that the lever is set at "FC", this step 102 is followed by a subsequent step 104 in which it is judged whether or not the vehicle air-conditioning equipment is operated. When it is judged that the equipment is operated, the step 104 is followed by a subsequent step 108 in which the evaporator temperature Te is set at 3 degrees centigrade. On the other hand, when it is not judged that the equipment is operated, the step 104 is followed by a subsequent step 106 in which the evaporator temperature Te is set at a temperature detected by the evaporator temperature sensor 18.

In the above description, the evaporator temperature Te is fixed at a temperature of 3 degrees centigrade since the actual temperature of the evaporator 6 is variable due to the presence of the evaporator defrost cycle. The use of such variable temperature clearly makes it difficult for the air-mixing door 9 to exhibit good operational stability. Incidentally, the defrost cycle is performed in the vehicle air-conditioning equipment by disconnecting the compressor (not shown) from the refrigerating circuit by energizing an electromagnetic clutch (not shown), the defrost cycle being required to prevent the evaporator 6 from freezing.

After the evaporator temperature Te is set at a temperature of 3 degrees centigrade in the step 108, the step 108 is followed by a subsequent step 110. In this step 110, it is judged whether or not the mode doors 13a, 13b, 13c are in vent positions. When it is judged that the mode doors 13a, 13b, 13c are not in the vent positions, the step 110 is followed by a step 116. On the other hand, when it is judged that the mode doors 13a, 13b, 13c are in the vent positions, the step 110 is followed by a step 112 in which it is judged whether or not a general signal T is smaller than or equal to a predetermined value (i.e., −5 in the flowchart shown in FIG. 2).

This general signal T represents a thermal load inside the passenger compartment of the vehicle, and is calculated from a predetermined equation using necessary parameters such as a temperature of the interior of the vehicle, the outside air temperature, a solar radiation temperature, an evaporator temperature, and the like.

In the step 112, when it is judged that the general signal is not smaller than or equal to the predetermined value (i.e., −5), the step 112 is followed by a step 116. On the other hand, when it is judged that the general signal is smaller than or equal to the predetermined value (i.e., −5), the step 112 is followed by a step 114 in which the general signal T is set at the predetermined value (i.e., −5). Then, the step 114 is followed by the step 116.

In the step 116, it is judged whether or not the present target opening angle $\Theta_A'$ is smaller than or equal to, for example, 60 percent.

This target opening angle $\Theta_A'$ represents a target opening angle of the air-mixing door 9, and is calculated from a predetermined equation in a step 126 (described later) using the general signal T, evaporator temperature Te, and constants α, β.

In the step 116, when it is judged that the target opening angle $\Theta_A'$ is smaller than or equal to 60 percent, the step 116 is followed by a subsequent step 118. In this step 118, as shown in FIG. 2, the constants α and β are set at K3 and K4, respectively. Then, the step 118 is followed by a subsequent step 120. In this step 120, the hysteresis limits, which define the insensitive band area, are set at plus or minus 5 percent. After that, the step 120 is followed by a step 126.

On the other hand, in the step 116, when it is not judged that the target opening angle $\Theta_A'$ is smaller than or equal to 60 percent, the step 116 is followed by a subsequent step 122. In this step 122, as shown in FIG. 2, the constants α and β are set at K1 and K2, respectively. Then, the step 122 is followed by a subsequent step 124. In this step 124, the hysteresis limits, which define the insensitive band area, are set at plus or minus 2.5 percent. After that, the step 124 is followed by the step 126.

In the above, the reason why the constants α, β are changed, depending on the amount of the target opening angle $\Theta_A'$ is as follows.

Namely, the relation between the opening angle of the air-mixing door 9 and a temperature of air introduced into the passenger compartment of the vehicle through the heater core 7 is approximately defined by a predetermined linear equation having an inflection point where the equation's constants (i.e., α, β) representing temperature control characteristics of the heater core 7 change. This inflection point corresponds to the target opening angle of 60 percent in the flowchart shown in FIG. 2. Consequently, such equation's constants α, β are changed to proper values, depending on the amount of the target opening angle $\Theta_A'$.

In the step 126, the target opening angle $\Theta_A'$ is calculated from a predetermined equation using the general signal T, evaporator temperature Te and the constants α, β. After that, the step 126 is followed by a step 132a shown in FIG. 3.

In the step 132a, it is judged whether or not a flag H is 1. When it is judged that the flag H is 1, the step 132a is followed by a step 148. On the other hand, when it is not judged that the flag H is 1, the step 132a is followed by a subsequent step 132b in which it is judged whether or not the flag H is 0. When it is judged that the flag H is 0, the step 132b is followed by a subsequent step 134a. On the other hand, when it is not judge that the flag H is 0, the step 132b is followed by a step 140.

In the step 134a, it is judged whether or not a value of "$-(\Theta_A'-\Theta_A)$" exceeds the hysteresis limits. When it is judged that the value of "$-(\Theta_A'-\Theta_A)$" exceeds the hysteresis limits, the step 134a is followed by the step 148. On the other hand, when it is not judged that the value of "$-(\Theta_A'-\Theta_A)$" exceeds the hysteresis limits, the step 134a is followed by a subsequent step 134b in which it is judged whether or not an absolute value of $(\Theta_A'-\Theta_A)$ is smaller than the hysteresis limits which are already determined in the above step 120 or 124.

In the step 134b, when it is judged that the absolute value of $(\Theta_A'-\Theta_A)$ is smaller than the hysteresis limits, the step 134b is followed by a subsequent step 136 in which the flag H is set at 0 again, since the air-mixing door is just in the target position or within the hysteresis limits thereof determined in the step 120 or 124, and, therefore there is no need for further drive of the air-mixing door actuator 14. After that, the step 136 is followed by a subsequent step 138 where the air-mixing door actuator 14 stops in operation, so that the subroutine shown in FIG. 3 is completed.

On the other hand, in the step 134a, when it is judged that the value of "$-(\Theta_A'-\Theta_A)$" exceeds the hysteresis limits determined in the step 120 or 124 (shown in FIG. 2), the step 134a is followed by the step 148 in which the flag H is set at 1. After that, the step 148 is followed by a subsequent step 150 in which it is judged whether or not the target opening angle $\Theta_A'$ is larger than or equal to the actual opening angle of the air-mixing door 9.

In the step 150, when it is not judged that the target opening angle $\Theta_A'$ is larger than or equal to the actual opening angle $\Theta_A$ of the air-mixing door 9 (i.e., the target opening angle $\Theta_A'$ is smaller than the actual opening angle $\Theta_A$), this fact means that the air-mixing door 9 is not properly positioned, and must be moved toward its closed side (i.e., full cool side). Consequently, the step 150 is followed by a subsequent step 152 in which the air-mixing door 9 is moved toward its closed side by further driving the air-mixing door actuator 14, so that the subroutine shown in FIG. 3 is completed.

Consequently, in a condition in which the flag H is 1 and the target opening angle $\Theta_A'$ is not larger than or equal to the actual opening angle $\Theta_A$, regardless of the presence of the hysteresis limits, the air-mixing door actuator 14 is driven until the air-mixing door 9 reaches the target opening angle $\Theta_A'$. After the air-mixing door 9 reaches target opening angle $\Theta_A'$, since the target opening angle $\Theta_A'$ becomes larger than or equal to the actual opening angle $\Theta_A$, it is possible to set the flag H at 0 in the step 136, as shown in FIG. 3, by which the provision of the hysteresis limits is effected, as is effected in the steps 134a, 134b.

On the other hand, in the step 150, when it is judged that the target opening angle $\Theta_A'$ is larger than or equal to the actual opening angle $\Theta_A$, the step 150 is followed by the step 136 in which the flag H is set at 0 to prevent the air-mixing door actuator 14 from being further driven. Consequently, the step 136 is followed by the step 138 in which the air-mixing door actuator 14 stops in operation, so that the subroutine shown in FIG. 3 is completed.

Further, in the step 134b, when it is judged that the absolute value of ($\Theta_A'-\Theta_A$) is not smaller than the hysteresis limits, i.e., that this absolute value is larger than or equal to the hysteresis limits, the step 134b is followed by a step 140 in which the flag H is set at 2. After that, the step 140 is followed by a subsequent step 142 in which it is judged whether or not the actual opening angle $\Theta_A$ is larger than or equal to the target opening angle $\Theta_A'$, as shown in FIG. 3.

In the step 142, when it is not judged that the actual opening angle $\Theta_A$ is larger than or equal to the target opening angle $\Theta_A'$, this fact means that the air-mixing door 9 is not properly positioned outside the hysteresis limits, and must be moved toward its opened side (i.e., full heat side). Consequently, the step 142 is followed by a subsequent step 146 in which the air-mixing door 9 is moved toward its opened side by further driving the air-mixing door actuator 14, so that the subroutine shown in FIG. 3 is completed.

Consequently, in a condition in which the flag H is 2 and the actual opening angle $\Theta_A$ is not larger than or equal to the target opening angle $\Theta_A'$, regardless of the presence of the hysteresis limits, the air-mixing door actuator 14 is driven until the air-mixing door 9 reaches the target opening angle $\Theta_A'$. After the air-mixing door 9 reaches the target opening angle $\Theta_A'$, since the actual opening angle $\Theta_A$ becomes larger than or equal to the target opening angle $\Theta_A'$, it is possible to set the flag H at 0 in the step 136, as shown in FIG. 3, by which the provision of the hysteresis limits is effected, as is effected in the steps 134a, 134b.

On the other hand, in the step 142, when it is judged that the actual opening angle $\Theta_A$ is larger than or equal to the target opening angle $\Theta_A'$, a further drive of the air-mixing door actuator 14 is not required. Consequently, the step 142 is followed by the steps 136, 138 in the same manner as described above, so that the subroutine shown in FIG. 3 is completed.

The method of the present invention for controlling the air-mixing door 9 is summarized as follows, in comparison with the conventional method, with reference to FIGS. 5 to 7.

Figure 6:
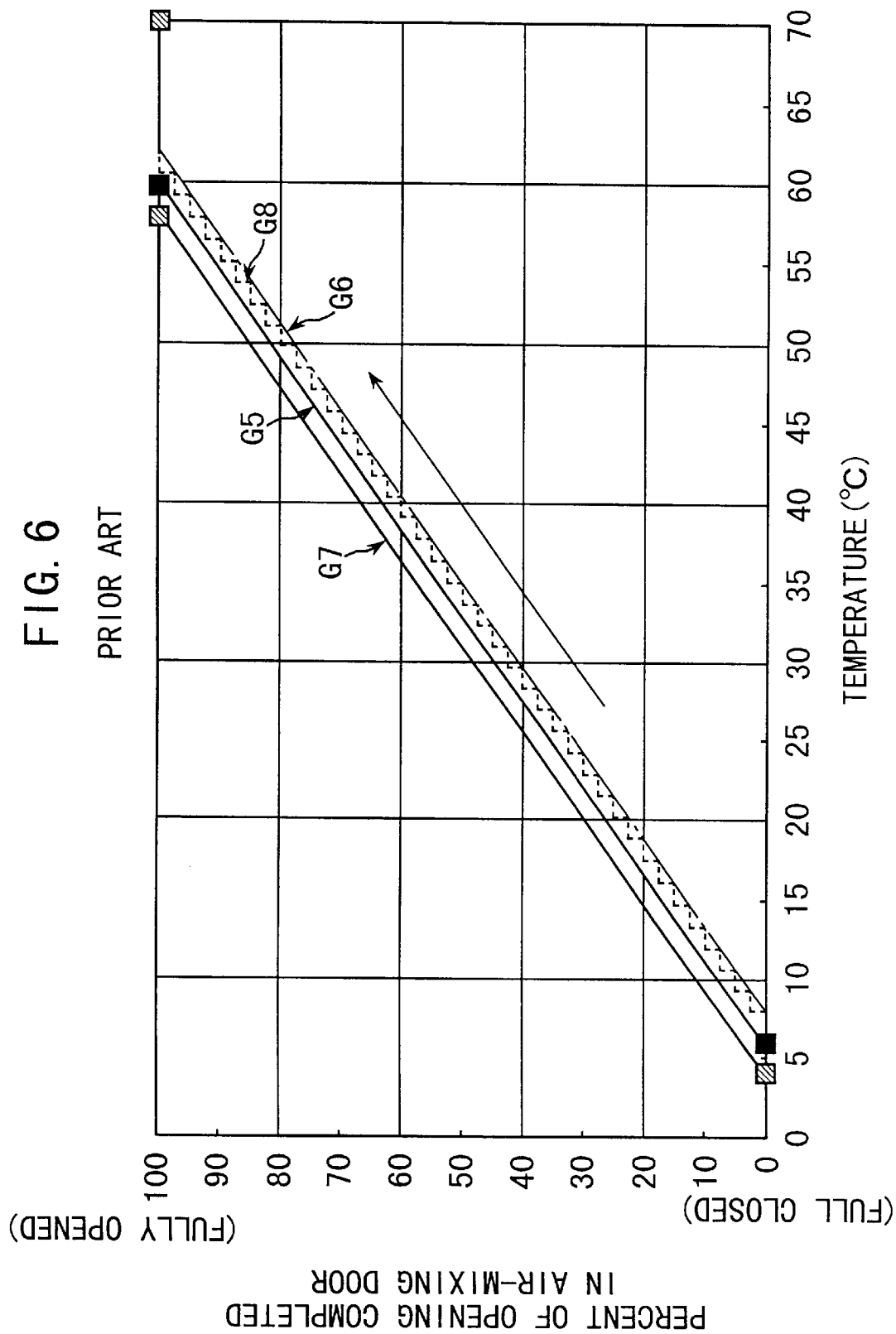
FIG. 6 is a graph showing the relationship between the target air-outlet temperature and the opening angle of a conventional air mixing door, which is driven by a conventional motor actuator having overrunning properties according to a conventional method for controlling the motor actuator.

FIG. 6 shows a completed opening angle of the air-mixing door 9 with a target air-outlet temperature, for a characteristic line graph G5 which is indicated in thick solid line and represents the target opening angle, and for another characteristic line graph G6 which is indicated in phantom line and represents a lower hysteresis limit. On the other hand, another characteristic line graph G7, indicated in thin solid line, represents an upper hysteresis limits.

In the graph shown in FIG. 6, a fully opened position of the air-mixing door 9 is denoted by 100 percent corresponding to a full heat position, while a fully closed position of the door 9 is denoted by 0 percent corresponding to a full cool position.

In the prior art, the motor actuator is permitted to overrun due to inertia, without stopping immediately after its drive signal is cut. When the motor actuator is controlled in the conventional manner in which the drive signal issued to the motor actuator is cut when the air-mixing door driven by the motor actuator reaches the hysteresis limits, the actual opening angle of the air-mixing door thus completed may near the line graph G5 (which represents the target opening angle) due to the overrunning effect of the motor actuator, but not reach the target opening angle, as shown in the line graph G8.

Figure 7:
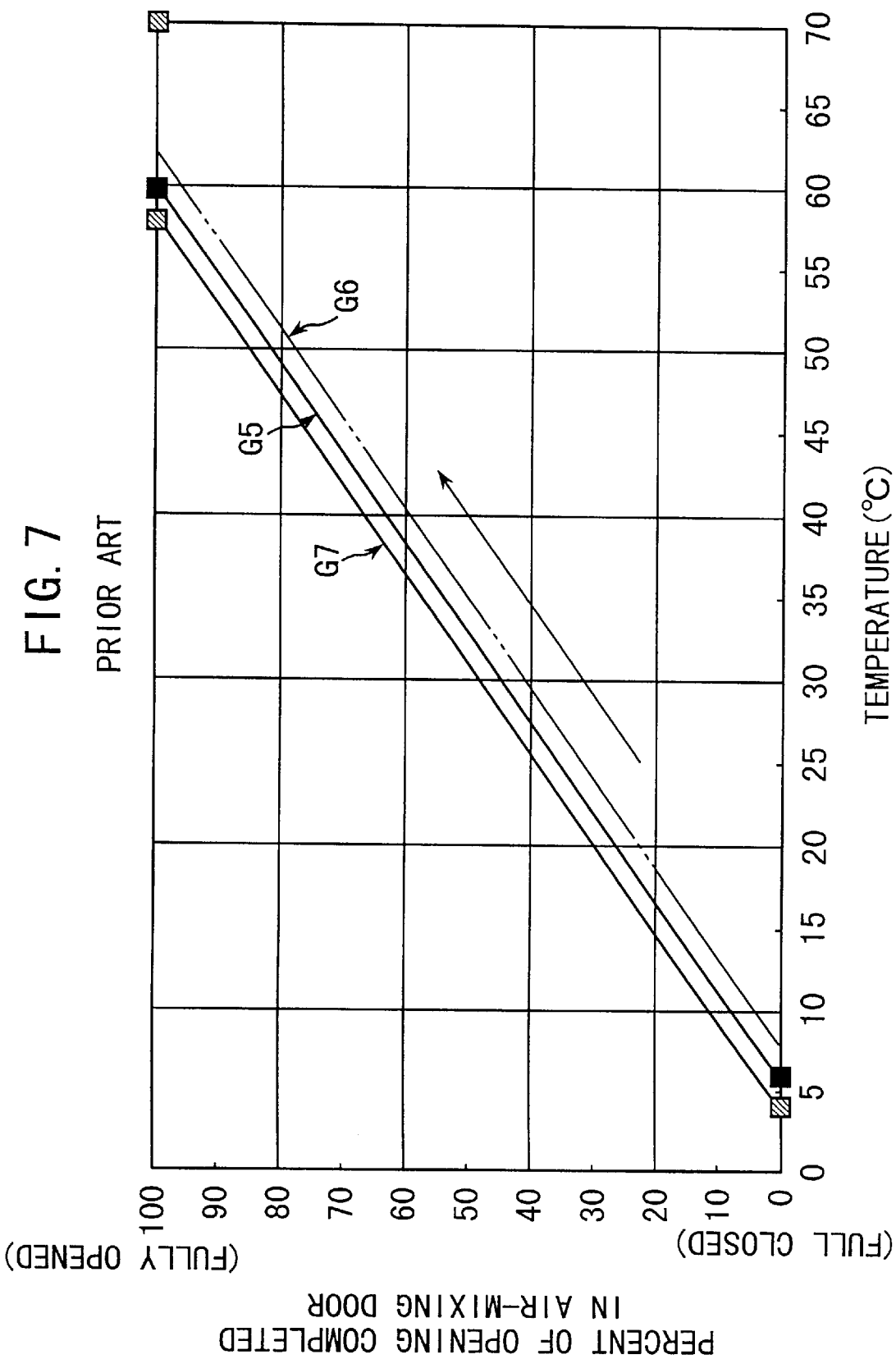
FIG. 7 is a graph showing the relationship between the target air-outlet temperature and the opening angle of a conventional air mixing door, which is driven by a conventional motor actuator according to a conventional method for controlling the motor actuator, provided that the motor actuator has no overrunning properties.

Also in the prior art, when the motor actuator free from any overrun is used, since the motor actuator may immediately stop when it reaches the hysteresis limits, the actual opening angle of the air-mixing door 9 is defined by the line graph G6 as shown in FIG. 7, so that the actual opening angle thus completed is smaller than its target opening angle by a minus one of the hysteresis limits.

In contrast with this, in the method of the present invention for controlling the air-mixing door 9, when the air-mixing door actuator 14 (shown in FIG. 1) is outside the hysteresis limits in its drive mode, since it is possible to drive the actuator 14 without considering the presence of the hysteresis limits, the air-mixing door 9 may reach the target opening angle. After the air-mixing door 9 reaches the target opening angle, the hysteresis limits are effected as in the prior art. Consequently, in this case, the actual opening angle of the air-mixing door 9 is defined by the line graph G4 which lies between the line graph G1 representing the target opening angle and the line graph G2 representing a lower one of the hysteresis limits. As is clear from FIG. 5, the line graph G4 is of a zigzag line type, and shown in dotted line.

In the first embodiment of the present invention shown in FIG. 1, the drive means is realized by the air-mixing door actuator 14. The apparatus of the present invention shown in FIG. 1 comprises a rotational motion recognition means which is realized by an opening angle sensor 22.

Further, the apparatus of the present invention includes: an angular difference judging means which is realized by the steps 134a, 134b (shown in FIG. 3) executed in the control unit 17 (shown in FIG. 1) and an actuation control means which is realized by the steps 132a and 132b, 136 to 152 executed in the control unit 17.

Incidentally, the rotational motion recognition means does not necessarily have to use the opening angle sensor 22. Namely, in order to detect the rotational position, it is also possible for the rotational motion recognition means to use the number of pulses, which is stored in the control unit 17 and supplied to the stepping motor (not shown) used in the air-mixing door actuator 14.

Now, a second embodiment of the method of the present invention for controlling the air-mixing door actuator by means of the control unit 17 will be described with reference to a flowchart of a subroutine shown in FIG. 4.

In operation, first, in a step 200 of the flowchart shown in FIG. 4, various constants, for example such as the constants A, B, C, D, E, F, G and the like used in the following equations are initialized. This step 200 is followed by a subsequent step 202 in which the target opening angle $\Theta_A'$ of the air-mixing door 9 is calculated from a predetermined equation (not shown).

After that, the step 202 is followed by a subsequent step 204 in which one of the constants, i.e., Wo, is calculated using a predetermined conversion table or map which is experimentally obtained. The constant Wo is used to determine an air-outlet temperature deviation S (described later).

More particularly, the constant Wo can be represented by the following experimental formula:

$$Wo = f(B \times T_{AM} - D \times T_{INC})$$

where: B and D are constants; $T_{AM}$ is a temperature of the outside air; and, $T_{INC}$ is a temperature of the interior of the passenger compartment of the vehicle.

After that, the step 204 is followed by a subsequent step 206. Calculated in this step 206 is the air-outlet temperature deviation S which represents a difference between a target air-outlet temperature and an actual air-outlet temperature (i.e., a temperature of the interior of the passenger compartment of the vehicle). Incidentally, in this step 206: $T_{PTC}$ is a setting temperature set by the temperature setting lever (not shown) used in the apparatus of the present invention shown in FIG. 1; $T'_{PTC}$ is a compensated version of the setting temperature $T_{PTC}$; and, $Q'_{SUN}$ is a compensated quantity of solar radiation.

After the air-outlet temperature deviation S is calculated, the step 206 is followed by a subsequent step 208a. In this step 208a, it is judged whether or not the setting temperature $T_{PTC}$ is a predetermined lower limit temperature of, for example, 18 degrees centigrade, as shown in FIG. 4. When it is judged that the setting temperature $T_{PTC}$ is the lower limit temperature of 18 degrees centigrade, the step 208a is followed by a step 220. On the other hand, in the step 208a, when it is not judged that the setting temperature $T_{PTC}$ is the lower limit temperature of 18 degrees centigrade, the step 208a is followed by a subsequent step 208b. In this step 208b, it is judged whether or not the setting temperature $T_{PTC}$ is within a range of from 19.5 to 31.5 degrees centigrade.

When it is judged that the setting temperature $T_{PTC}$ is within a range of from 19.5 to 31.5 degrees centigrade, the step 208b is followed by a subsequent step 210a. On the other hand, when in the step 208b, it is not judged that the setting temperature $T_{PTC}$ is within a range of from 19.5 to 31.5 degrees centigrade, this fact means that the setting temperature $T_{PTC}$ is set at a predetermined upper limit temperature of, for example, 32 degrees centigrade. Consequently, the step 208b is followed by a step 218.

Consequently, in the step 208b, when it is found that the setting temperature $T_{PTC}$ is set at the predetermined upper limit temperature of, for example, 32 degrees centigrade, it is necessary to fully open the air-mixing door 9. Therefore, in the step 218 following the step 208b, the air-mixing door actuator 14 is driven so as to set the air-mixing door 9 at its fully opened position corresponding to a "FULL HEAT" position, so that the subroutine shown in FIG. 4 is completed.

Further, in the step 208a, when it is judged that the setting temperature $T_{PTC}$ is set at the predetermined lower limit temperature of 18 degrees centigrade, it is necessary to fully close the air-mixing door 9. Therefore, in the step 220 following the step 208a, the air-mixing door actuator 14 is driven so as to set the air-mixing door 9 at its fully closed position (i.e., 0 percent shown in FIG. 5) corresponding to a "FULL COOL" position, so that the subroutine shown in FIG. 4 is completed.

On the other hand, in the step 208b, when it is judged that the setting temperature $T_{PTC}$ is within a range of from 19.5 to 31.5 degrees centigrade, the step 208b is followed by the step 210a in which it is judged whether or not the flag H is "1". When it is judged that the flag H is "1", the step 210a is followed by a step 228. When it is not judged that the flag H is "1", the step 210a is followed by a subsequent step 210b in which it is judged whether or not the flag H is "0". When it is judged that the flag H is "0", the step 210b is followed by a subsequent step 212a. On the other hand, when it is not judged that the flag H is "0", this fact means that the flag H is "2". Consequently, the step 210b is followed by a step 222 in which the flag H is set at "2".

In the step 212a following the step 210b, it is judged whether or not the air-outlet temperature deviation S calculated in the above is smaller than a predetermined value of "–SO". When it is judged that the air-outlet temperature deviation S is smaller than the predetermined value of "–SO", the step 212a is followed by the step 228. On the other hand, in the step 212a, when it is not judged that the air-outlet temperature deviation S is smaller than the predetermined value of "–SO", the step 212a is followed by a subsequent step 212b. In this step 212b, it is judged whether or not the absolute value of the air-outlet temperature deviation S is smaller than or equal to the predetermined value of "SO". When it is judged that the absolute value of the air-outlet temperature deviation S is smaller than or equal to the predetermined value of "SO", this fact means that the target temperature is accomplished, and, therefore there is no need for further drive of the air-mixing door actuator 14. Consequently, the step 212b is followed by a subsequent step 214 in which the flag H is set at "0", so that the air-mixing door actuator 14 stops in operation in a step 216 following the step 214, whereby the subroutine shown in FIG. 4 is completed.

Consequently, the predetermined value "SO" serves as the insensitive band area limits.

On the other hand, in the step 212b, when it is not judged that the absolute value of the air-outlet temperature deviation S is smaller than or equal to the predetermined value "SO", this fact means that the air-outlet temperature deviation S is larger than the predetermined value "SO". In other words, this fact means that the target air-outlet temperature is larger than the actual temperature of the interior of the passenger compartment of the vehicle. Consequently, the step 212b is followed by the step 222 in which the flag H is set at "2", as shown in FIG. 4. The step 222 is followed by a subsequent step 224. In this step 224, it is judged whether or not the air-outlet temperature deviation S is larger than 0. When it is judged that the air-outlet temperature deviation S is larger than 0, it is necessary to move the air-mixing door 9 to its fully opened position (i.e., "FULL HEAT" position). Consequently, the step 224 is followed by a subsequent step 226 in which the air-mixing door actuator 14 is driven so as to move the air-mixing door 9 to its fully opened position, whereby the subroutine shown in FIG. 4 is completed.

Consequently, so far as the flag H is "2" and the air-outlet temperature deviation S is larger than 0, the air-mixing door actuator 14 is driven until the air-mixing door 9 reaches the target opening angle $\Theta_A{}'$, regardless of the presence of the hysteresis limits. After the air-mixing door 9 reaches the target opening angle $\Theta_A{}'$, since the air-outlet temperature deviation S is not larger than 0, the flag H is set at "0" in the step 214 following the step 224, to effect the provision of the hysteresis limits.

On the other hand, in the step 224 following the step 222, when it is judged that the air-outlet temperature deviation S is not larger than 0, this fact means that there is no need for further drive of the air-mixing door actuator 14. Consequently, the step 224 is followed by the step 214. After that the same processing procedures as those described in the above as to the steps 214, 216 are used, so that the subroutine shown in FIG. 4 is completed.

Further, in the step 212a, when it is judged that the air-outlet temperature deviation S is smaller than the predetermined value of "−SO", this fact means that the actual temperature of the interior of the passenger compartment of the vehicle is higher than the target temperature. Consequently, in the step 228 following the step 212a, the flag H is set at "1". This step 228 is then followed by a subsequent step 230 in which it is judged whether or not the air-outlet temperature deviation is smaller than 0. When it is judged that air-outlet temperature deviation is smaller than 0, this fact means that the air-mixing door 9 should be moved to its fully closed position (i.e., to its "FULL COOL" position). Consequently, the step 230 is followed by a subsequent step 232. In this step 232, the air-mixing door actuator 14 is so driven as to move the air-mixing door 9 to its fully closed position (i.e., 0 percent shown in FIG. 5), whereby the subroutine shown in FIG. 4 is completed.

Consequently, so long as the flag H is "1" and the air-outlet temperature deviation S is smaller than 0, the air-mixing door actuator 14 is driven until the air-mixing door 9 reaches the target opening angle $\Theta_A{}'$, regardless of the presence of the hysteresis limits. After the air-mixing door 9 reaches the target opening angle $\Theta_A{}'$, since the air-outlet temperature deviation S is not smaller than 0, there is no need for further drive of the air-mixing door actuator 14. Consequently, the step 230 is followed by the step 214. Thereafter, the same processing procedures as those described in the above as to the steps 214, 216 are used, so that the subroutine shown in FIG. 4 is completed.

As described above, in this second embodiment of the method of the present invention, when the air-outlet temperature deviation S is within a predetermined range in either the plus or minus direction, the air-mixing door actuator 14 is not driven (see the steps 212a, 212b, 214, 216). In contrast with this, when the air-outlet temperature deviation S is out of such predetermined range in either the plus or minus direction, the air-mixing door actuator 14 is driven so as to move the air-mixing door 9 to its necessary side (see the steps 212a, 212b, 222, 224, 226, 228, 230, 232), whereby the air-mixing door 9 is set at its target opening angle, as in the first embodiment of the method of the present invention.

Figure 5:
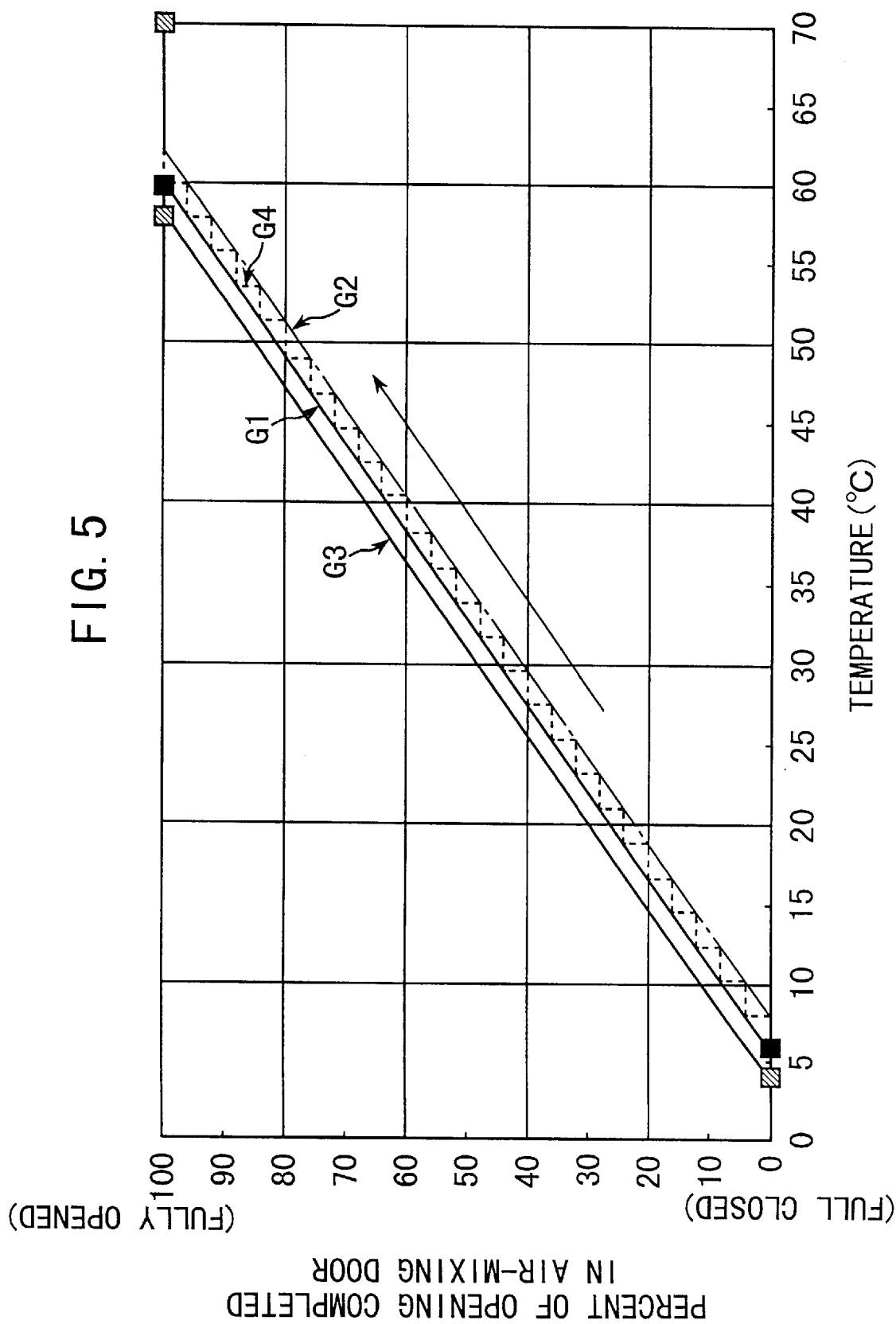
FIG. 5 is a graph showing the relationship between the target air-outlet temperature and the opening angle of the air mixing door, illustrating control properties of the mixing door actuator used in the apparatus of the present invention shown in FIG. 1.

In a summary of the above, as shown in the graph of FIG. 5 wherein the X-axis is graduated in temperature (centigrade) and the Y-axis is graduated in opening angle of the air-mixing door 9 (percent), in the second embodiment of the method of the present invention, a target line graph G1 shows the target opening angle of the air-mixing door 9, while a lower limit line graph G2 shows a lower hysteresis limit, and is smaller in opening angle than the target line graph G1 by the predetermined amount "SO". On the other hand, an upper limit line graph G3 shows an upper hysteresis limit, and is larger in opening angle than the target line graph G1 by the predetermined amount "SO".

Consequently, an actual line graph G4, which is shown in dotted line between the line graphs G1 and G2, shows the actual opening angle of the air-mixing door 9 in operation.

Incidentally, in the second embodiment of the present invention described above, the air-mixing door actuator 14 forms a drive means used in the apparatus of the present invention, and the passenger compartment temperature sensor 21 forms an air temperature detection means for detecting a temperature of air inside the vehicle.

Further, in the second embodiment of the present invention executing of the steps 212a, 212b in the flowchart shown in FIG. 4 realizes a temperature difference judging means, and executing of the steps 210a, 210b, 214, 216, and 222 to 232 in the control unit 17 realizes an actuator control means.

In the embodiments of the present invention described above, though the air-mixing door actuator 14 is descried to be constructed of a stepping motor, it is also possible that the air-mixing door actuator 14 is constructed of any other motor of a no-overrun type, or constructed of a suitable motor with a little overrun, provided that such overrun does not affect the method and apparatus of the present invention in operation.

In the above description, the control unit 17 substantially serves as a computer, and, therefore previously stores the program described in the flowchart shown in FIGS. 2 to 4. However, such program is not necessarily stored in the control unit 17, since the program may be stored in any other suitable recording medium. In this case, the program is retrieved from such recording medium by a suitable reader, and inputted to the control unit 17 so as to be executed therein.

Figure 8:
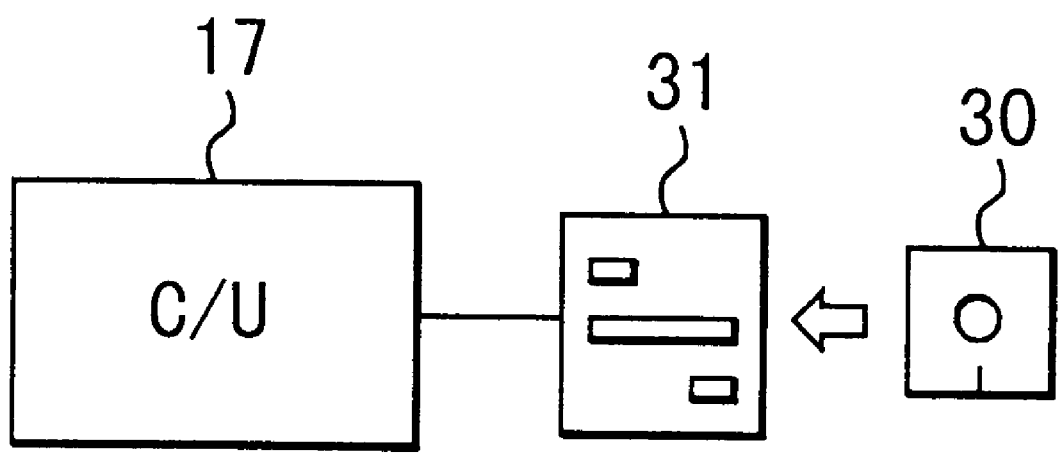
FIG. 8 is a schematic block diagram of the control unit connected with a floppy disk drive unit which receives a floppy disk to retrieve a desired program therefrom.

For example, as shown in FIG. 8, the above recording medium may be constructed of a floppy disk 30 which carries the program. In this case, a floppy disk drive unit 31 is connected with the control unit 17, so that the program is retrieved from the floppy disk 30 by the disk drive unit 31 and inputted to the control unit 17.

Incidentally, the recording medium may be constructed of any other suitable means, such as, for example magnetic tapes, hard disks and the like.

As described above, in the present invention, the motor actuators are improved with respect to the control accuracy in the drive mode of the motor actuator. When the insensitive band area is provided in the vicinity of the target value to stabilize the operation as in the prior art, such provision of the insensitive band area is undone in case the motor actuator is driven from outside the insensitive band area, which enables the motor actuator to reach its target value.

Consequently, this improves the motor actuator in control accuracy and in control speed. Further, in the present invention, after the motor actuator reaches its target value, the provision of the insensitive band area is effected so as to stabilize the control operation in the vicinity of the target value.

Further, as for the provision of the insensitive band area, switching from undoing to effecting or vice versa of the insensitive band area can be easily accomplished by only executing the program without requiring any special circuit, which makes it possible for the apparatus of the present invention to have a simple construction.

What is claimed is:

1. An apparatus for controlling a motor actuator under a drive mode operable for rotatably driving an air-mixing door used in a vehicle air-conditioning equipment, and provided with a drive means for driving the motor actuator in accordance with an input signal supplied from outside, said apparatus comprising:

a position judging means for judging a drive position of the motor actuator; and an actuation control means for controlling the motor actuator in operation, wherein said actuation control means is operable to activate the drive means when said position judging means judges that the motor actuator is out of a predetermined range from a target drive position, and is operable to stop operation of said drive means when said position judging means judges that the motor actuator comes within the predetermined range of the target drive position;

wherein: said position judging means is provided with a rotational motion recognition means for recognizing an angular position of the air-mixing door, and an angular difference judging means for judging whether or not a difference in opening angle of the air-mixing door between a target opening angle calculated based on a desired air-outlet temperature according to a predetermined equation and an actual opening angle corresponding to the angular position of the air-mixing door recognized by said rotational motion recognition means exceeds a predetermined value;

whereby: a judgment that the difference in opening angle of the air-mixing door judged by said angular difference judging means is larger than or equal to the predetermined value indicates that the actual opening angle of the air-mixing door is outside of a predetermined range from the target opening angle, which corresponds to the fact that an actual position of the motor actuator is outside of the predetermined range from a target drive position; and a judgment that the difference in opening angle of the air-mixing door judged by said angular difference judging means is less than said predetermined value indicates that the actual opening angle of the air-mixing door comes within the predetermined range of the target opening angle, which corresponds the fact that the actual position of the motor actuator comes within the predetermined range of the target drive position.

2. The apparatus for controlling the motor actuator, as set forth in claim 1, wherein:

the motor actuator is constructed of a motor with a minimum overrun.

3. The apparatus for controlling the motor actuator, as set forth in claim 1, wherein:

the motor actuator is constructed of a stepping motor.

4. An apparatus for controlling a motor actuator under a drive mode operable for rotatably driving an air-mixing door used in a vehicle air-conditioning equipment, and provided with a drive means for driving the motor actuator in accordance with an input signal supplied from outside, said apparatus comprising:

a position judging means for judging a drive position of the motor actuator; and an actuation control means for controlling the motor actuator in operation, wherein said actuation control means is operable to activate the drive means when said position judging means judges that the motor actuator is out of a predetermined range from a target drive position, and is operable to stop operation of said drive means when said position judging means judges that the motor actuator comes within the predetermined range of the target drive position;

wherein: said position judging means is provided with an air temperature detection means for detecting a temperature of air inside a vehicle, and a temperature difference judging means for judging whether or not a difference in air temperature between any two: a target air-outlet temperature calculated based on various data inputted from outside; an estimated temperature calculated based on an opening angle of the air-mixing door; and the actual temperature detected by said air temperature detection means is larger than or equal to a predetermined value;

whereby: a judgment that the difference in temperature of air judged by said temperature difference judging means is larger than or equal to the predetermined value indicates that an actual opening angle of the air-mixing door is outside of a predetermined range from a target opening angle, which corresponds to the fact that an actual position of the motor actuator is outside of the predetermined range from the target drive position; and, a judgement that the difference in temperature of air judged by said temperature difference judging means is less than the predetermined value indicated that the actual opening angle of the air-mixing door comes within the predetermined range of the target opening angle, which corresponds the fact that the actual position of the motor actuator comes within the predetermined range of the target drive position.

5. The apparatus for controlling the motor actuator, as set forth in claim 4, wherein:

the motor actuator is constructed of a motor with a minimum overrun.

6. The apparatus for controlling the motor actuator, as set forth in claim 4, wherein:

the motor actuator is constructed of a stepping motor.

7. A motor actuator control apparatus for use with an air-mixing door of a vehicle air-conditioning equipment, said motor actuator control apparatus comprising:

a motor actuator operable to rotatably drive the air-mixing door;

a drive circuit operable to drive said motor actuator;

a rotational motion recognition device operable to recognize an actual angular position of the air-mixing door; and an angular difference judging means for calculating a target angular position of the air-mixing door based on a desired air-outlet temperature according to a predetermined equation and for judging whether or not a difference between the target angular position of the air-mixing door calculated by said angular difference judging means and the actual angular position of the air-mixing door recognized by said rotational motion recognition device exceeds a predetermined value.

8. A motor actuator control apparatus as claimed in claim 7, wherein said motor actuator comprises a motor having a minimum overrun.

9. A motor actuator control apparatus as claimed in claim 7, wherein said motor actuator comprises a stepping motor.

10. A motor actuator control apparatus as claimed in claim 7, further comprising:

processing means for setting a hysteresis limit for the target angular position of the air-mixing door based on the value of the target angular position of the air-mixing door calculated by said angular difference judging means, for determining whether the actual angular position of the air-mixing door is outside the hysteresis limit and for determining whether the actual angular position of the air-mixing door is within the hysteresis limit, for maintaining the angular position of the air mixing door when said processing means determines that the angular position of the air-mixing door is within the hysteresis limit, and for driving the air-mixing door with said drive circuit and said motor actuator until the actual angular position of the air-mixing door is equal to the target angular position once said processing means determines that the actual angular position of the air-mixing door is outside of the hysteresis limit.

11. A motor actuator control apparatus for use with an air-mixing door of air-conditioning equipment of a vehicle, said motor actuator control apparatus comprising:

a motor actuator operable to rotatably drive the air mixing door;

a drive circuit operable to drive said motor actuator;

an air temperature detector operable to detect an air temperature inside the vehicle;

a temperature difference judging means for judging whether or not a difference in air temperature between any two of: a target air-outlet temperature calculated based on inputted data; an estimated temperature calculated based on an opening angle of the air mixing door; and the temperature detected by said air temperature detector is larger than or equal to a predetermined value.

12. A motor actuator control apparatus as claimed in claim 11, further comprising:

processing means for calculating an air-outlet temperature deviation, for determining whether the air-outlet temperature deviation is outside a band area limit and determining whether the air-outlet temperature deviation is within the band area limit, for maintaining an angular position of the air mixing door when said processing means determines that the air-outlet temperature deviation is within the band area limit, and for driving the air-mixing door with said drive circuit and said motor actuator until the air-outlet temperature deviation is zero once said processing means determines that the air-outlet temperature deviation is outside of the band area limit.

13. A motor actuator control apparatus as claimed in claim 11, wherein said motor actuator comprises a motor having a minimum overrun.

14. A motor actuator control apparatus as claimed in claim 11, wherein said motor actuator comprises a stepping motor.

15. A motor actuator control apparatus for use with an air-mixing door of an air-conditioning equipment of a vehicle, said motor actuator control apparatus comprising:

a motor actuator operable to rotatably drive the air mixing door;

a drive circuit operable to drive said motor actuator;

a rotational motion recognition device operable to recognize an actual angular position of the air-mixing door;

an air temperature detector operable to detect an air temperature inside the vehicle;

processing means for calculating a target air-outlet temperature based on inputted data, and for calculating an estimated temperature based on the opening angle of the air-mixing door recognized by said rotational motion recognition device; and a temperature difference judging means for judging whether or not a difference in air temperature between any two of: the target air-outlet temperature calculated by said processing means; the estimated temperature calculated by said processing means; and the temperature detected by said air temperature detector is larger than or equal to a predetermined value.

16. A motor actuator control apparatus as claimed in claim 15, wherein said processing means is further operable for calculating an air-outlet temperature deviation, for determining whether the air-outlet temperature deviation is outside a band area limit and determining whether the air-outlet temperature deviation is within the band area limit, for maintaining the angular position of the air mixing door when said processing means determines that the air-outlet temperature deviation is within the band area limit, and for driving the air-mixing door with said drive circuit and said motor actuator until the air-outlet temperature deviation is zero once said processing means determines that the air-outlet temperature deviation is outside of the band area limit.

17. A motor actuator control apparatus as claimed in claim 15, wherein said motor actuator comprises a motor having a minimum overrun.

18. A motor actuator control apparatus as claimed in claim 15, wherein said motor actuator comprises a stepping motor.

19. A motor actuator control apparatus as claimed in claim 15, wherein said processing means is further operable for determining a full heat setting and a full cool setting, and said drive circuit is further operable for driving said motor actuator to drive the air mixing door to a full heat position when said processing means determines a full heat setting and for driving said motor actuator to drive the air mixing door to a full cool position when said processing means determines a full cool setting.

* * * * *